(No Model.)

F. F. LANDIS.
VEHICLE.

No. 562,623. Patented June 23, 1896.

Witnesses
George H. Bliss.
J. McAllister.

Inventor
Frank F. Landis.
By Attorney Herbert W. T. Jenner.

UNITED STATES PATENT OFFICE.

FRANK F. LANDIS, OF WAYNESBOROUGH, PENNSYLVANIA.

VEHICLE.

SPECIFICATION forming part of Letters Patent No. 562,623, dated June 23, 1896.

Application filed September 3, 1895. Serial No. 561,246. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Vehicles; and I do hereby declare the following to be a full, clear, and exact description of the invention, such as will enable others skilled in the art to which it appertains to make and use the same.

This invention relates to vehicles; and it consists in the novel construction and combination of the parts hereinafter fully described and claimed whereby the front axle is connected to the body of the vehicle.

Figure 1:
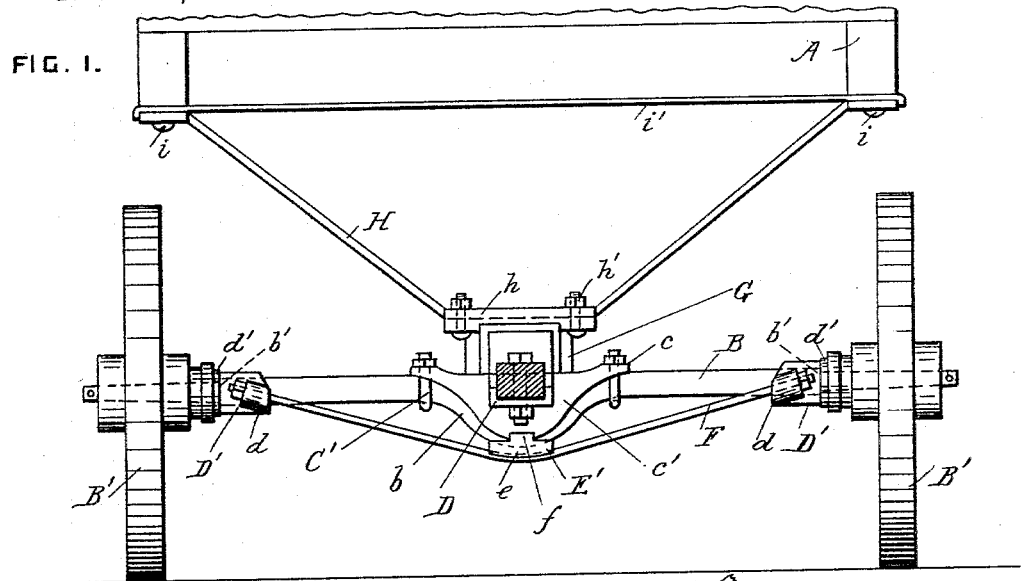
Figure 2:
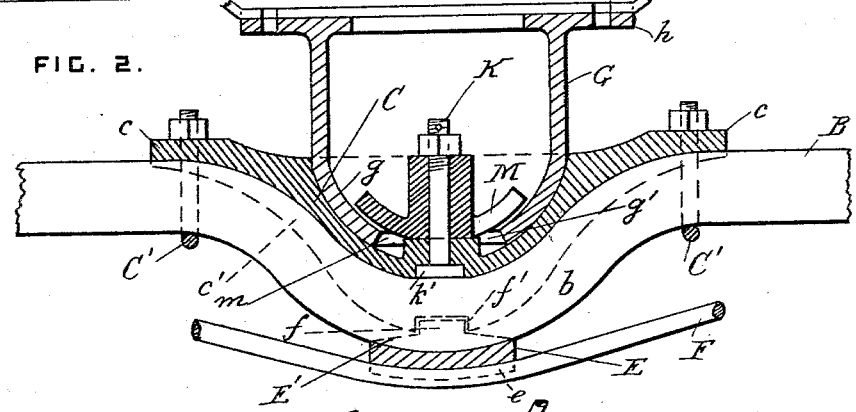
Figure 3:
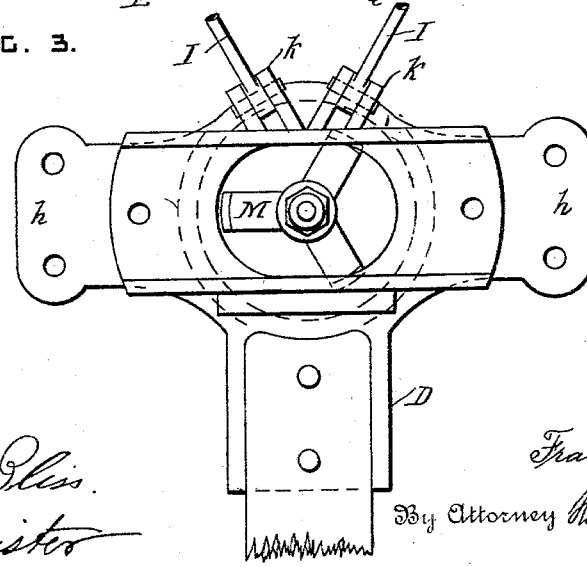

In the drawings, Figure 1 is a front view of the axle and wheels, showing their connection to the body of the vehicle. Fig. 2 is a longitudinal section through the king-post and its socket, drawn to a larger scale. Fig. 3 is a plan view of the king-post and its socket.

A is a portion of the body of a vehicle.

B is the front axle, provided with a central downwardly-bent portion $b$.

B' are the road-wheels, journaled on the ends of the axle in any approved manner.

The axle B is preferably square, and is provided with shoulders $b'$ where it is turned circular to form the bearings for the road-wheel hubs.

C is a concavo-convex socket secured in the bent portion $b$ of the axle. This socket is provided with lugs $c$, which rest upon the top of the axle, and flanges $c'$ at its front and rear engaging with the sides of the axle. C' are clips which secure the lugs $c$ to the axle. The socket C strengthens the central portion of the axle to a greater extent than the bent portion $b$ weakens it.

D is a lug on the upper front part of the socket C for the attachment of a vehicle-pole of any approved construction.

D' are sleeves provided with laterally-projecting lugs $d$, and circular portions $d'$, which engage with the shoulders $b'$ on the axle. The ends of the circular portions $d'$ form stops for the wheel-hubs to run against.

E is a plate provided with one or more grooves $e$ on its under side.

E' are flanges on the sides of the plate, which engage with the center portion of the axle. The flanges E' are provided with projections $f$, which engage with recesses $f'$ in the flanges $c'$ of the socket, and the said interlocking flanges prevent the plate E from moving longitudinally of the axle.

F are two truss-rods bearing on the under side of the plate E, and having their ends secured to the sleeves D'. The ends of the truss-rods are preferably passed through holes in the lugs $d$ and are provided with nuts for tightening them.

G is the king-post, which is preferably hollow, and is provided with a hollow hemispherical lower end $g$, having a central hole $g'$. The king-post is secured to the body A of the vehicle in any approved manner.

H is a bracket secured to the flanges $h$ of the king-post by the bolts $h'$. This bracket is arranged crosswise of the vehicle and its upper ends are secured to the vehicle-body by the bolts $i$. A tie-bar $i'$ extends transversely of the vehicle and operates to keep the upper ends of the bracket H from spreading.

I are diverging stay-rods secured to the lugs $k$ on the rear of the king-post and to the under side of the vehicle-body.

K is a central bolt provided with a head $k'$, resting on the top of the axle and let into a recess in the under side of the socket. This bolt passes through a hole in the socket and has a winged retaining-plate M secured on its upper part. The plate M is convex, and $m$ are spaces between the said plate and the socket for the lower portion of the king-post to slide in. The hole $g'$ of the king-post is large enough to permit the socket to move freely to a limited extent in every direction, and the winged plate prevents the king-post from rising out of the socket.

The center of the draft-pole is arranged to come approximately in line with the center of oscillation of the socket. The device is simple and inexpensive, and requires no skilled labor to construct it.

What I claim is—

1. The combination, with an axle, having a central downwardly-bent portion and a hemispherical socket secured in the said bent portion, of a hollow king-post provided with a hemispherical lower end having a central hole, and a convex retaining-plate secured to the said socket and projecting within the said king-post, substantially as set forth.

2. The combination, with an axle, and a hemispherical socket secured to it, of a hollow king-post provided with a hemispherical lower end having a central hole, a bracket secured to the top of the king-post and extending crosswise of the vehicle, a tie-bar engaging with the upper ends of the said bracket, diverging braces secured to the rear part of the king-post, and a convex retaining-plate secured to the said socket and projecting within the king-post, substantially as set forth.

3. The combination, with an axle provided with a central downwardly-bent portion, of a concavo-convex socket secured in the said bent portion, and a king-post provided with a hemispherical lower end engaging with the said socket, substantially as set forth.

4. The combination, with an axle provided with a central downwardly-bent portion and shoulders near its ends, of road-wheels journaled on the end portions of the axle, sleeves interposed between the said wheels and shoulders and forming stops for the wheel-hubs to run against, and a truss coupling together the said sleeves and supporting the central portion of the axle, substantially as set forth.

5. The combination, with an axle, and a socket for the king-post secured to its central portion and provided with flanges engaging with the axle, of a plate arranged under the axle and provided with flanges engaging with the said axle and interlocking with the aforesaid flanges of the socket, and truss-rods passing under the said plate and having their ends secured to the axle, substantially as set forth.

6. The combination, with an axle provided with a central downwardly-bent portion, of a concavo-convex socket secured to the axle and provided with flanges engaging with its sides, a hollow king-post provided with a hemispherical lower end having a central hole, and a convex retaining-plate secured to the said socket and projecting within the said king-post, substantially as set forth.

In testimony whereof I affix my signature in presence of two witnesses.

FRANK F. LANDIS.

Witnesses:
 ALF. N. RUSSELL,
 THOMAS V. URAL.